United States Patent
Banerjee

(10) Patent No.: US 9,171,178 B1
(45) Date of Patent: Oct. 27, 2015

(54) SYSTEMS AND METHODS FOR OPTIMIZING SECURITY CONTROLS FOR VIRTUAL DATA CENTERS

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 228 days.

(21) Appl. No.: 13/471,166

(22) Filed: May 14, 2012

(51) Int. Cl.
*G06F 15/16* (2006.01)
*G06F 21/62* (2013.01)
*H04L 29/08* (2006.01)

(52) U.S. Cl.
CPC ........ *G06F 21/6218* (2013.01); *H04L 67/1097* (2013.01)

(58) Field of Classification Search
CPC . H04L 9/45558; H04L 67/1097; H04L 63/10; G06F 9/45558; G06F 21/6218; G06F 3/067
See application file for complete search history.

(56) References Cited

U.S. PATENT DOCUMENTS

| | | | | |
|---|---|---|---|---|
| 5,740,252 | A * | 4/1998 | Minor et al. | 713/153 |
| 5,991,753 | A * | 11/1999 | Wilde | 1/1 |
| 6,834,324 | B1 * | 12/2004 | Wood | 711/111 |
| 6,928,476 | B2 * | 8/2005 | Bucher | 709/225 |
| 7,024,427 | B2 * | 4/2006 | Bobbitt et al. | 1/1 |
| 7,392,234 | B2 * | 6/2008 | Shaath et al. | 1/1 |
| 8,060,940 | B2 * | 11/2011 | McCorkendale et al. | 726/26 |
| 8,117,244 | B2 * | 2/2012 | Marinov et al. | 707/827 |
| 8,838,931 | B1 * | 9/2014 | Marshak et al. | 711/170 |
| 9,021,546 | B1 * | 4/2015 | Banerjee | 726/1 |
| 2004/0010545 | A1 * | 1/2004 | Pandya | 709/203 |
| 2004/0078568 | A1 * | 4/2004 | Pham et al. | 713/165 |
| 2005/0120160 | A1 * | 6/2005 | Plouffe et al. | 711/1 |
| 2005/0198451 | A1 * | 9/2005 | Kano et al. | 711/162 |
| 2006/0053112 | A1 * | 3/2006 | Chitkara et al. | 707/9 |
| 2006/0085852 | A1 * | 4/2006 | Sima | 726/22 |
| 2006/0190552 | A1 * | 8/2006 | Henze et al. | 709/216 |
| 2007/0027985 | A1 * | 2/2007 | Ramany et al. | 709/224 |
| 2007/0271234 | A1 * | 11/2007 | Ravikiran | 707/3 |
| 2008/0005794 | A1 * | 1/2008 | Inoue et al. | 726/22 |
| 2008/0007770 | A1 * | 1/2008 | Tokunaga | 358/1.15 |
| 2008/0016349 | A1 * | 1/2008 | Kahn | 713/168 |
| 2008/0046960 | A1 * | 2/2008 | Bade et al. | 726/1 |
| 2008/0052466 | A1 * | 2/2008 | Zulauf | 711/125 |

(Continued)

OTHER PUBLICATIONS

Itani, "An Efficient and Scalable Security Protocol for Protecting Fixed-Content Objects in Content Addressable Storage Architectures", Third International Conference on Security and Privacy in Communications Networks and the Workshops, 2007. SecureComm 2007, IEEE, pp. 63-72.*

(Continued)

*Primary Examiner* — Andrew Nalven
*Assistant Examiner* — Walter Malinowski
(74) *Attorney, Agent, or Firm* — ALG Intellectual Property, LLC

(57) ABSTRACT

A computer-implemented method for optimizing security controls for virtual data centers may include 1) identifying a security policy that applies to at least one workload configured to store data on a first storage appliance, 2) identifying at least one storage-appliance functionality capable of implementing at least a part of the security policy, 3) identifying a second storage appliance that possesses the storage-appliance functionality, and 4) migrating the data from the first storage appliance to the second storage appliance in response to identifying the security policy and the storage-appliance functionality. Variants include methods, systems, and computer-readable media.

20 Claims, 6 Drawing Sheets

(56) References Cited

U.S. PATENT DOCUMENTS

| | | | |
|---|---|---|---|
| 2008/0155223 A1* | 6/2008 | Hiltgen et al. | 711/173 |
| 2009/0037594 A1* | 2/2009 | Sever et al. | 709/230 |
| 2009/0094530 A1* | 4/2009 | Champlain et al. | 715/752 |
| 2009/0183233 A1* | 7/2009 | Trueba | 726/3 |
| 2009/0217345 A1* | 8/2009 | Backa | 726/1 |
| 2009/0228379 A1* | 9/2009 | Honts et al. | 709/203 |
| 2009/0288084 A1* | 11/2009 | Astete et al. | 718/1 |
| 2010/0061242 A1* | 3/2010 | Sindhu et al. | 370/235 |
| 2010/0064340 A1* | 3/2010 | McCorkendale et al. | 726/1 |
| 2010/0107216 A1* | 4/2010 | Tobe et al. | 726/1 |
| 2010/0125730 A1* | 5/2010 | Dodgson et al. | 713/153 |
| 2010/0138830 A1* | 6/2010 | Astete et al. | 709/226 |
| 2011/0131619 A1* | 6/2011 | Hasek et al. | 725/93 |
| 2011/0231541 A1* | 9/2011 | Murthy et al. | 709/224 |
| 2011/0271062 A1* | 11/2011 | Chen | 711/154 |
| 2012/0011340 A1* | 1/2012 | Flynn et al. | 711/171 |
| 2012/0054486 A1* | 3/2012 | Lakkavalli et al. | 713/156 |
| 2012/0110650 A1* | 5/2012 | Van Biljon et al. | 726/4 |
| 2012/0130554 A1* | 5/2012 | Jain et al. | 700/291 |
| 2012/0144110 A1* | 6/2012 | Smith | 711/114 |
| 2012/0221683 A1* | 8/2012 | Ferris | 709/218 |
| 2012/0222084 A1* | 8/2012 | Beaty et al. | 726/1 |
| 2013/0024661 A1* | 1/2013 | Abdallah | 712/205 |

OTHER PUBLICATIONS

Coles, "Pro T-SQL 2008 Programmer's Guide", Apress, Aug. 20, 2008, 659 pages, chapters 7 and 8.*

Stewart, "NetApp and VMware vSphere Storage Best Practices", TR-3749, version 1.0, Jun. 2009, 96 pages.*

Raj, "Cloud Computing for Enterprise Architectures", "The Convergence of Enterprise Architecture (EA) and Cloud Computing", chapter 4, Computer Communications and Networks, Spring-Verlag, 2011, pp. 61-87.*

Deb Banerjee; Systems and Methods for Workload Security in Virtual Data Centers; U.S. Appl. No. 13/291,716, filed Nov. 8, 2011.

* cited by examiner

SYSTEMS AND METHODS FOR OPTIMIZING SECURITY CONTROLS FOR VIRTUAL DATA CENTERS

BACKGROUND

In the digital age, organizations increasingly depend on computing resources to manage data and to provide internal and external services. In order to manage increasingly complex information technology infrastructures, some organizations may use virtual data centers. By virtualizing computing resources (e.g., processing, storage, and/or network resources), a virtual data center may enable an administrator to focus on computing tasks to be performed (i.e., "workloads"), and the computing resources required to execute these tasks, instead of the particular configuration of the underlying physical devices.

Additionally, organizations may wish to protect data (e.g., by scanning, encrypting, securely storing, backing up, enforcing access to, monitoring access to, and/or isolating data) in order to ensure compliance with internal or external data-protection requirements, such as governmental laws and regulations, partnership agreements with other organizations, etc. Unfortunately, enforcing such security policies may consume significant computing, storage, and networking resources, thereby potentially impacting the performance of primary applications in the virtual data center. Accordingly, the instant disclosure identifies and addresses a need for additional and improved systems and methods for optimizing security controls for virtual data centers.

SUMMARY

As will be described in greater detail below, the instant disclosure generally relates to systems and methods for optimizing security controls for virtual data centers by migrating storage for workloads to storage appliances with native capacities to facilitate the application of security policies based on the security policies of the workloads. In one example, a computer-implemented method for optimizing security controls for virtual data centers may include 1) identifying a security policy that applies to at least one workload configured to store data on a first storage appliance, 2) identifying at least one storage-appliance functionality capable of implementing at least a part of the security policy, 3) identifying a second storage appliance that possesses the storage-appliance functionality, and 4) migrating the data from the first storage appliance to the second storage appliance in response to identifying the security policy and the storage-appliance functionality.

In some examples, identifying the security policy may include 1) identifying sensitive data that is stored by the workload and 2) identifying a security policy to encrypt sensitive data stored by the workload in response to identifying the sensitive data. Additionally or alternatively, identifying the security policy may include 1) identifying potentially malicious data stored by the workload and 2) identifying a security policy to scan data stored by the workload for malware in response to identifying the potentially malicious data.

In some embodiments, implementing the security policy may include encrypting sensitive data stored by the workload. In these embodiments, identifying the storage-appliance functionality may include identifying an encryption functionality native to the second storage appliance. In some examples, implementing the security policy may include scanning the data stored by the workload. In these examples, identifying the storage-appliance functionality may include identifying a scanning functionality native to the second storage appliance.

In one embodiment, identifying the second storage appliance may include 1) identifying an additional security policy that prohibits a predetermined storage location of the data (for example, based on data classification) and 2) determining that the predetermined storage location does not include a location of the second storage appliance. Additionally or alternatively, the computer-implemented method may further include determining that the first storage appliance does not include the storage-appliance functionality. In this example, migrating the data from the first storage appliance to the second storage appliance may be further in response to determining that the first storage appliance does not include the storage-appliance functionality (e.g., that is necessary and/or helpful for implementing the security policy). In some examples, migrating the data may include performing a live migration of the data from the first storage appliance to the second storage appliance without taking the workload offline.

In one embodiment, a system for implementing the above-described method may include 1) an identification module programmed to identify a security policy that applies to at least one workload configured to store data on a first storage appliance, 2) a functionality module programmed to identify at least one storage-appliance functionality capable of implementing at least a part of the security policy, 3) a matching module programmed to identify a second storage appliance that possesses the storage-appliance functionality, and 4) a migration module programmed to migrate the data from the first storage appliance to the second storage appliance in response to identifying the security policy and the storage-appliance functionality. The system may also include at least one processor configured to execute the identification module, the functionality module, the matching module, and the migration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a security policy that applies to at least one workload configured to store data on a first storage appliance, 2) identify at least one storage-appliance functionality capable of implementing at least a part of the security policy, 3) identify a second storage appliance that possesses the storage-appliance functionality, and 4) migrate the data from the first storage appliance to the second storage appliance in response to identifying the security policy and the storage-appliance functionality.

As will be explained in greater detail below, by migrating storage for workloads to storage appliances with native capacities to facilitate the application of security policies based on the security policies of the workloads, the systems and methods described herein may leverage the native capabilities of available storage appliances to enforce security policies instead of consuming computing resources within virtual data centers that would otherwise be available to primary applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
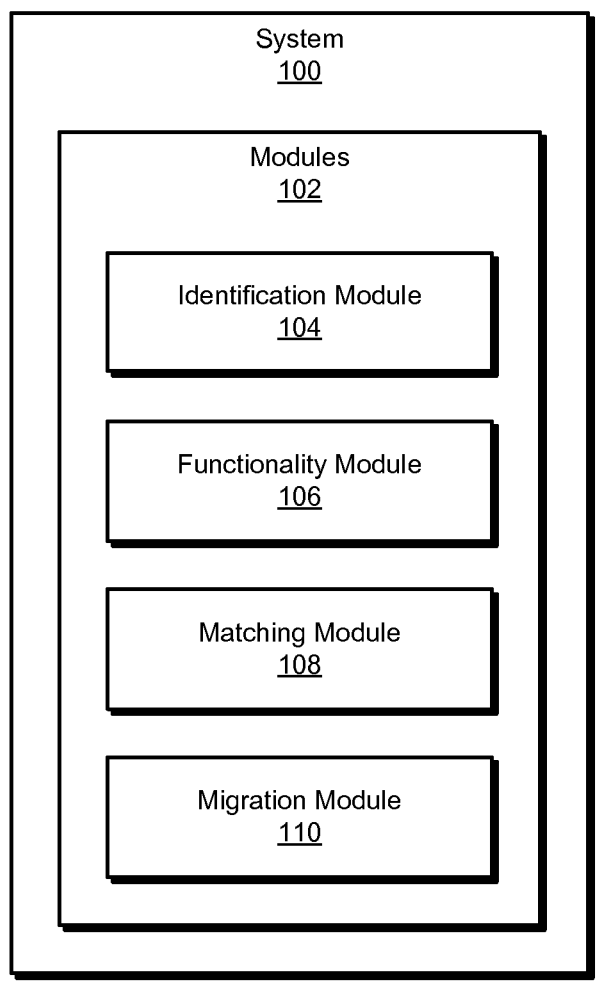
FIG. 1 is a block diagram of an exemplary system for optimizing security controls for virtual data centers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
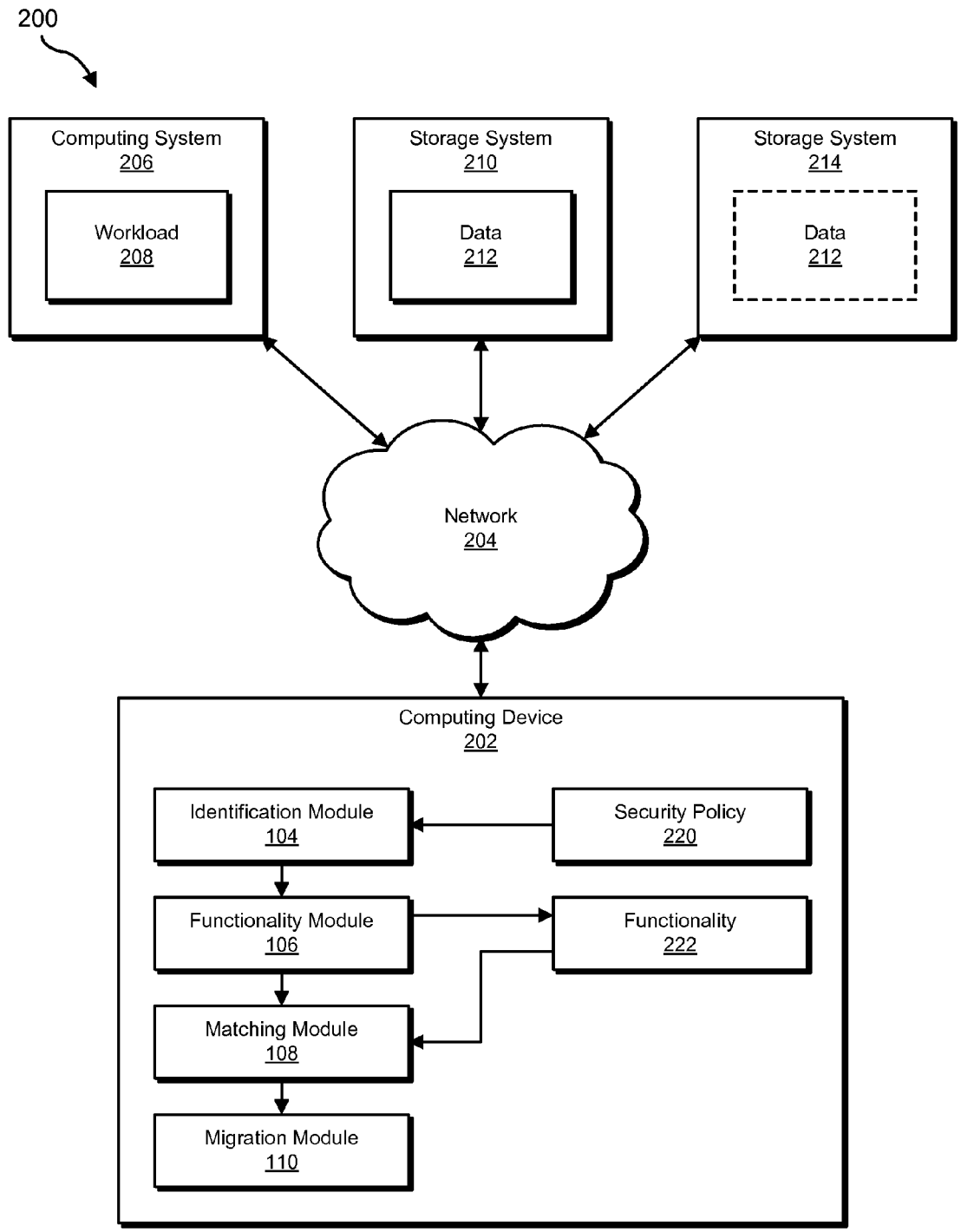
FIG. 2 is a block diagram of an exemplary system for optimizing security controls for virtual data centers.
Figure 3:
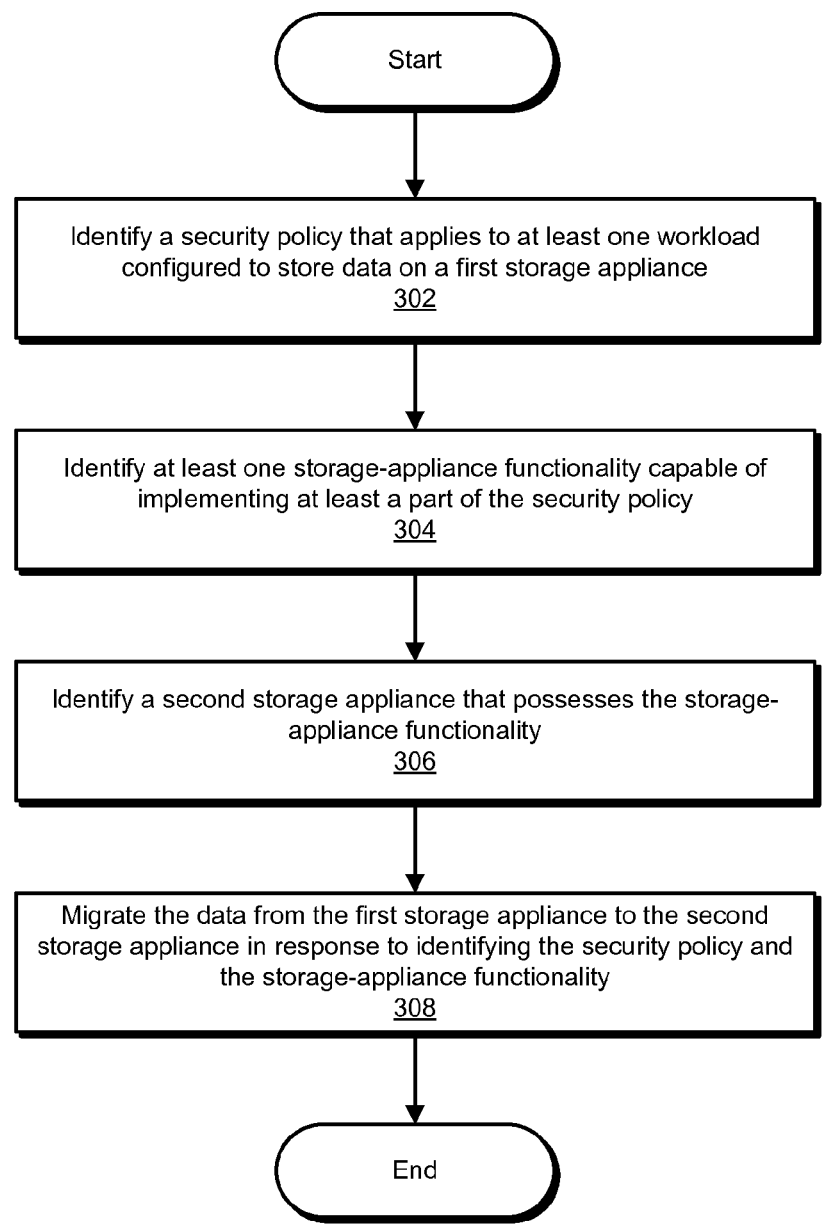
FIG. 3 is a flow diagram of an exemplary method for optimizing security controls for virtual data centers.
Figure 4:
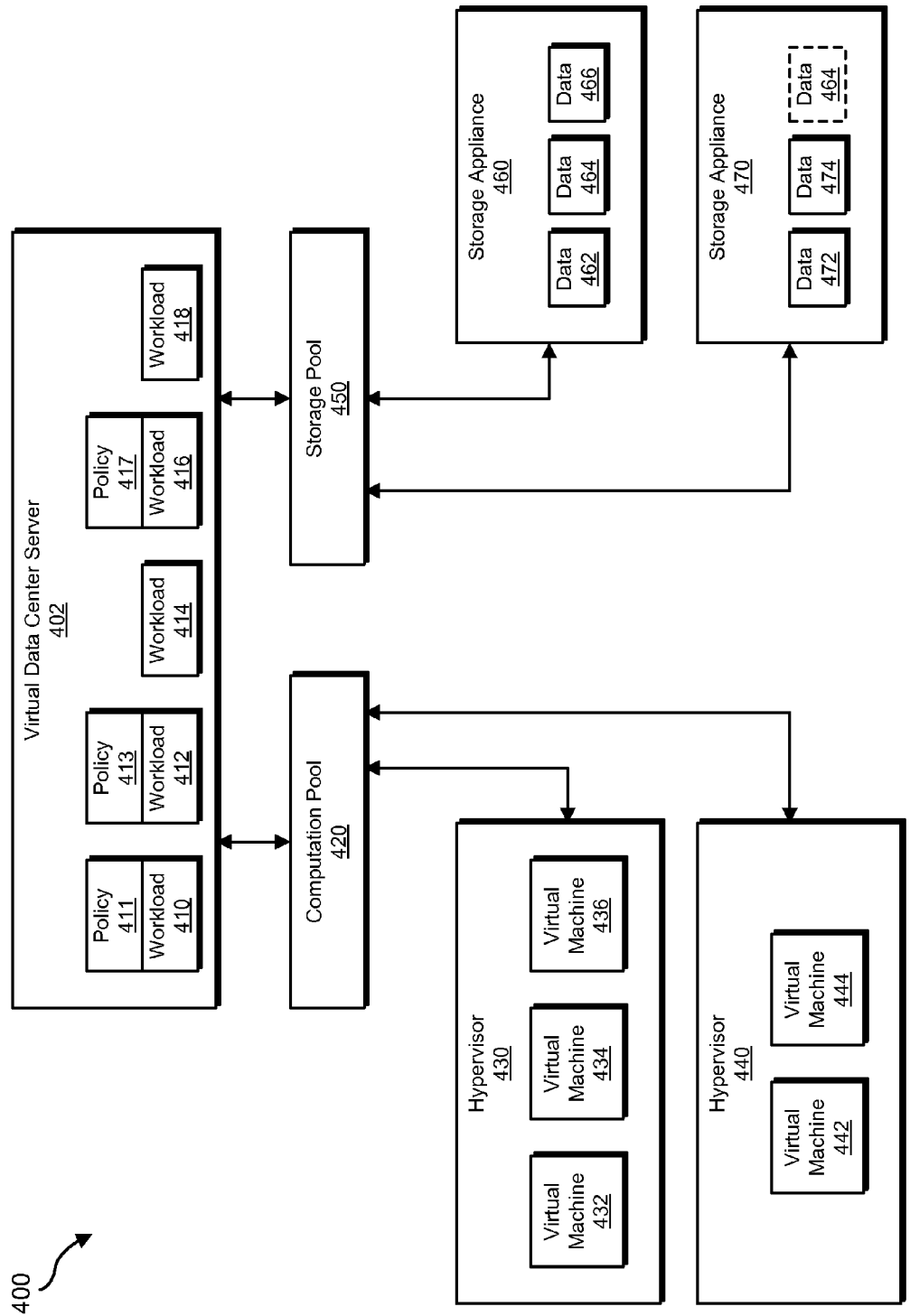
FIG. 4 is a block diagram of an exemplary system for optimizing security controls for virtual data centers.

The following will provide, with reference to FIGS. 1, 2, and 4, detailed descriptions of exemplary systems for optimizing security controls for virtual data centers. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for optimizing security controls for virtual data centers. As illustrated in this figure, exemplary system 100 may include one or more modules 102 for performing one or more tasks. For example, and as will be explained in greater detail below, exemplary system 100 may include an identification module 104 programmed to identify a security policy that applies to at least one workload configured to store data on a first storage appliance. Exemplary system 100 may also include a functionality module 106 programmed to identify at least one storage-appliance functionality capable of implementing at least a part of the security policy.

In addition, and as will be described in greater detail below, exemplary system 100 may include a matching module 108 programmed to identify a second storage appliance that possesses the storage-appliance functionality. Exemplary system 100 may also include a migration module 110 programmed to migrate the data from the first storage appliance to the second storage appliance in response to identifying the security policy and the storage-appliance functionality. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing system 206, storage system 210, and/or storage system 214), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., a virtual data center management server) in communication with a computing system 206, and storage system 210, and a storage system 214 via a network 204.

In one embodiment, one or more of modules 102 from FIG. 1 may, when executed by at least one processor of computing device 202, facilitate computing device 202 in optimizing security controls for virtual data centers. For example, and as will be described in greater detail below, one or more of modules 102 may cause computing device 202 to 1) identify a security policy 220 that applies to a workload 208 configured to store data 212 on a storage system 210, 2) identify a storage-appliance functionality 222 capable of implementing at least a part of security policy 220, 3) identify a storage system 214 that possesses functionality 222, and 4) migrate data 212 from storage system 210 to storage system 214 in response to identifying security policy 220 and functionality 222.

Computing device 202 generally represents any type or form of computing device capable of reading computer-executable instructions. Examples of computing device 202 include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device. In some examples, computing device 202 may represent a management server for a virtual data center.

Computing system 206 generally represents any type or form of computing device that is capable of reading computer-executable instructions. Examples of computing system 206 include, without limitation, hypervisors, servers, virtual machines, clusters, and application servers and database servers configured to provide various database services and/or run certain software applications.

Storage systems 210 and 214 generally represent any type or form of computing device that is capable of storing, organizing, and/or retrieving data. Storage systems 210 and 214 may represent portions of a single storage device or a plurality of storage devices.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202, computing system 206, storage system 210, and/or storage system 214.

FIG. 3 is a flow diagram of an exemplary computer-implemented method 300 for optimizing security controls for virtual data centers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a security policy that applies to at least one workload configured to store data on a first storage appliance. For example, at step 302 identification module 104 may, as part of computing device 202 in FIG. 2, identify security policy 220 that applies to workload 208 configured to store data 212 on storage system 210.

As used herein, the phrase "security policy" may refer to any policy, rule, rule set, and/or configuration for requiring and/or ensuring compliance with internal and/or external security and/or data-protection requirements, such as internal practices, governmental laws and regulations, partnership agreements with other organizations, good-practice standards, etc. For example, the security policy may include one or more rules for ensuring compliance with the Health Insurance Portability and Accountability Act ("HIPAA"). In another example, the security policy may include one or more rules for ensuring compliance with payment card industry ("PCI") standards (e.g., the Payment Card Industry Data Security Standard ("PCI DSS")). Security policies may include any of a variety of rules. Examples of security policy rules include, without limitation, data storage security rules (e.g., requiring encryption for stored data), data preservation rules (e.g., requiring backups, replication, and/or indexing of data), data transmission rules (e.g., requiring encryption of data in movement across networks), exploit management rules (e.g., requiring use of anti-malware systems, requiring certain system configurations to prevent exploits, etc.), rules for access-control measures (e.g., restricting methods of access to data, requiring identity verification methods, etc.), geo-location rules requiring that certain data classifications be stored only in certain geographic locations, and rules for security-verification measures (e.g., systems to monitor access to computing resources and/or data, systems to test the security of systems and/or processes).

As used herein, the term "workload" may refer to any job, task, and/or application that may be hosted by and/or executed within a virtual data center. For example, a virtual data center may provision a workload with one or more virtualized resources. As used herein, the phrase "virtual data center" may refer to any system for virtualizing computing resources (e.g., processing, storage, and/or network resources). In some examples, a virtual data center may provide a common computing infrastructure. As used herein, the phrase "common computing infrastructure" may refer to any set of computing resources underlying the virtualized resources provided by a virtual data center. For example, the common computing infrastructure may include one or more hypervisors, storage devices, and/or networking devices.

As used herein, the phrase "storage appliance" may refer to any device for storing, managing, organizing, and/or retrieving data. In some examples, the storage appliance may include one or more native capabilities for analyzing, transforming, and/or controlling movement of stored data.

Identification module 104 may identify the security policy in any of a variety of contexts. For example, identification module 104 may identify the security policy when the security policy is assigned to the workload (e.g., on a management server). Additionally or alternatively, identification module 104 may identify the security policy by identifying a list of workloads with associated security policies. In some examples, identification module 104 may identify the security policy in response to identifying a potential security vulnerability for the workload. For example, identification module 104 may identify sensitive data that is stored by the workload (e.g., by receiving a message from an agent within a virtual machine) and then identify a security policy to encrypt sensitive data stored by the workload in response to identifying the sensitive data. Additionally or alternatively, identification module 104 may identify potentially malicious data stored by the workload (e.g., by receiving a message from an agent within a virtual machine) and then identify a security policy to scan data stored by the workload for malware in response to identifying the potentially malicious data. In some examples, identification module 104 may identify the security policy while reviewing workload and storage distribution after the addition of a storage appliance to a virtual data center.

FIG. 4 illustrates an exemplary system 400 for optimizing security controls for virtual data centers. As shown in FIG. 4, exemplary system 400 may include a virtual data center server 402 configured to manage workloads 410, 412, 414, 416, and 418 within system 400 (e.g., by allocating computing resources from a computation pool 420 and storage resources from a storage pool 450 for the workloads). In some examples, one or more of the workloads managed by exemplary system 400 may be subject to one or more security policies. For example, virtual data center server 402 may apply a policy 411 to workload 410, a policy 413 to workload 412, and a policy 417 to workload 416. Using FIG. 4 as an example, at step 302 identification module 104 may identify policy 413 for workload 412.

Returning to FIG. 3, at step 304 one or more of the systems described herein may identify at least one storage-appliance functionality capable of implementing at least a part of the security policy. For example, at step 304 functionality module 106 may, as part of computing device 202 in FIG. 2, identify storage-appliance functionality 222 capable of implementing at least a part of security policy 220.

As used herein, the phrase "storage-appliance functionality" may refer to any feature, capability, capacity, and/or functionality that is native to and/or which may be provided by a storage appliance. In some examples, a storage-appliance functionality may be implemented in part by an integrated processing device. For example, the storage-appliance functionality may enable a storage appliance to analyze, protect, and/or control data stored by the storage appliance (e.g., based on the content of the data).

In some examples, implementing the security policy may include encrypting sensitive data stored by the workload. In these examples, functionality module 106 may identify the storage-appliance functionality by identifying an encryption functionality (e.g., that is, as will be discussed below, native to the second storage appliance). In some examples, implementing the security policy may include scanning the data stored by the workload. For example, the security policy may entail scanning the data stored by the workload for malware. In these examples, identifying the storage-appliance functionality may include identifying a scanning functionality (e.g., that is, as will be discussed below, native to the second storage appliance).

Using FIG. 4 as an example, at step 304 functionality module 106 may identify a storage-appliance functionality that is capable of implementing at least a part of policy 413. For example, policy 413 may require that data stored by workload 412 be encrypted, and functionality module 106 may therefore identify a storage-appliance functionality capable of encrypting (and/or facilitating the efficient encryption of) stored data.

Returning to FIG. 3, at step 306 one or more of the systems described herein may identify a second storage appliance that possesses the storage-appliance functionality. For example, at step 306 matching module 108 may, as part of computing device 202 in FIG. 2, identify storage system 214 that possesses functionality 222.

Matching module 108 may identify the second storage appliance in any suitable manner. For example, matching module 108 may identify and query a database of storage appliances and storage-appliance functionalities to identify the second storage appliance as possessing the storage-appliance functionality. Additionally or alternatively, matching module 108 may identify a configuration repository associating the second storage appliance with the storage-appliance functionality.

In some examples, matching module 108 may identify multiple storage appliances with the storage-appliance functionality and determine that the storage-appliance functionality as implemented with the second storage appliance meets a preferred standard. For example, the security policy may require data encryption, but may indicate a preference for an encryption standard implemented by the second storage appliance. Additionally or alternatively, matching module 108 may be configured with the preferred standard. In some examples, matching module 108 may identify multiple storage appliances with the functionality to implement at least a part of the security policy but may determine that the storage-appliance functionality as implemented with the second storage appliance is capable of independently performing a larger and/or more resource-intensive portion of the security policy than alternative storage appliances. In one example, matching module 108 may determine that the specifications of the second storage appliance (e.g., storage reliability, I/O speeds, etc.) are preferable given the security policy (e.g., will aid in applying the security policy more quickly, more reliably, with less external computing cost, etc.).

In some examples, matching module 108 may identify the second storage appliance in part by determining that the matching module 108 is suitable given one or more additional security requirements and/or restrictions. For example, matching module 108 may identify an additional security policy that prohibits a predetermined storage location of the data (e.g., a security policy that prohibits the data from leaving a specified network, a security policy that prohibits the data from leaving a specified geographic area, etc.). In this example, matching module 108 may select the second storage appliance in part based on determining that the predetermined storage location does not include a location of the second storage appliance.

Matching module 108 may also determine that the second storage appliance is better equipped to enforce the security policy than the first storage appliance. For example, matching module 108 may determine that the first storage appliance does not include the storage-appliance functionality. Additionally or alternatively, matching module 108 may determine that the second storage appliance is configured to implement a greater portion of the security policy than a configuration of the first storage appliance allows. In some examples, matching module 108 may determine that the second storage appliance is configured to implement the security policy to a preferred standard in comparison to the first storage appliance.

Using FIG. 4 as an example, computation pool 420 may include a hypervisor hosting virtual machines 432, 434, and 436, and a hypervisor 440 hosting virtual machines 442 and 444. Virtual machine 436 on hypervisor 430 may perform computations for workload 412. Storage pool 450 may include a storage appliance 460 storing data 462, 464 and 466, and a storage appliance 470 storing data 472 and 474. Workload 412 may store data 466 on storage appliance 460. In this example, matching module 108 may determine that storage appliance 470 includes a functionality capable of implementing and/or facilitating the implementation of at least a portion of policy 413. For example, storage appliance 470 may automatically encrypt stored data as required by policy 413.

Returning to FIG. 3, at step 308 one or more of the systems described herein may migrate the data from the first storage appliance to the second storage appliance in response to identifying the security policy and the storage-appliance functionality. For example, at step 308 migration module 110 may, as part of computing device 202 in FIG. 2, migrate data 212 from storage system 210 to storage system 214 in response to identifying security policy 220 and functionality 222.

Migration module 110 may migrate the data in any suitable manner. For example, migration module 110 may perform a live migration of the data from the first storage appliance to the second storage appliance without taking the workload offline. As used herein, the phrase "live migration" may refer to any migration and/or transfer of data that minimizes and/or eliminates downtime for a workload, application, and/or virtual machine that stores, accesses, and/or otherwise uses the data. For example, the phrase "live migration" may refer to copying data from an original location to a target location before removing the data from the original location. In some examples, the live migration may include ensuring that all write transactions to the data during the live migration are reflected at the target location at the end of the live migration and that an up-to-date version of the data is available throughout the live migration.

In some examples, as mentioned earlier, one or more of the systems described herein may determine that the first storage appliance does not include the storage-appliance functionality. In these examples, migration module 110 may migrate the data from the first storage appliance to the second storage appliance further in response to determining that the first storage appliance does not include the storage-appliance functionality.

Using FIG. 4 as an example, at step 308 migration module 110 may migrate data 464 from storage appliance 460 to storage appliance 470. Accordingly, storage appliance 470 may implement at least a portion of policy 413 to data 464 such that workload 412 complies with policy 413. In some examples, migration module 110 and/or one or more of the other systems described herein may configure storage appliance 470 to apply the storage-appliance functionality to data 464 (e.g., configure a volume of data containing data 464 for native encryption on storage appliance 470).

As explained above, by migrating storage for workloads to storage appliances with native capacities to facilitate the application of security policies based on the security policies of the workloads, the systems and methods described herein may leverage the native capabilities of available storage appliances to enforce security policies instead of consuming computing resources within virtual data centers that would otherwise be available to primary applications.

Figure 5:
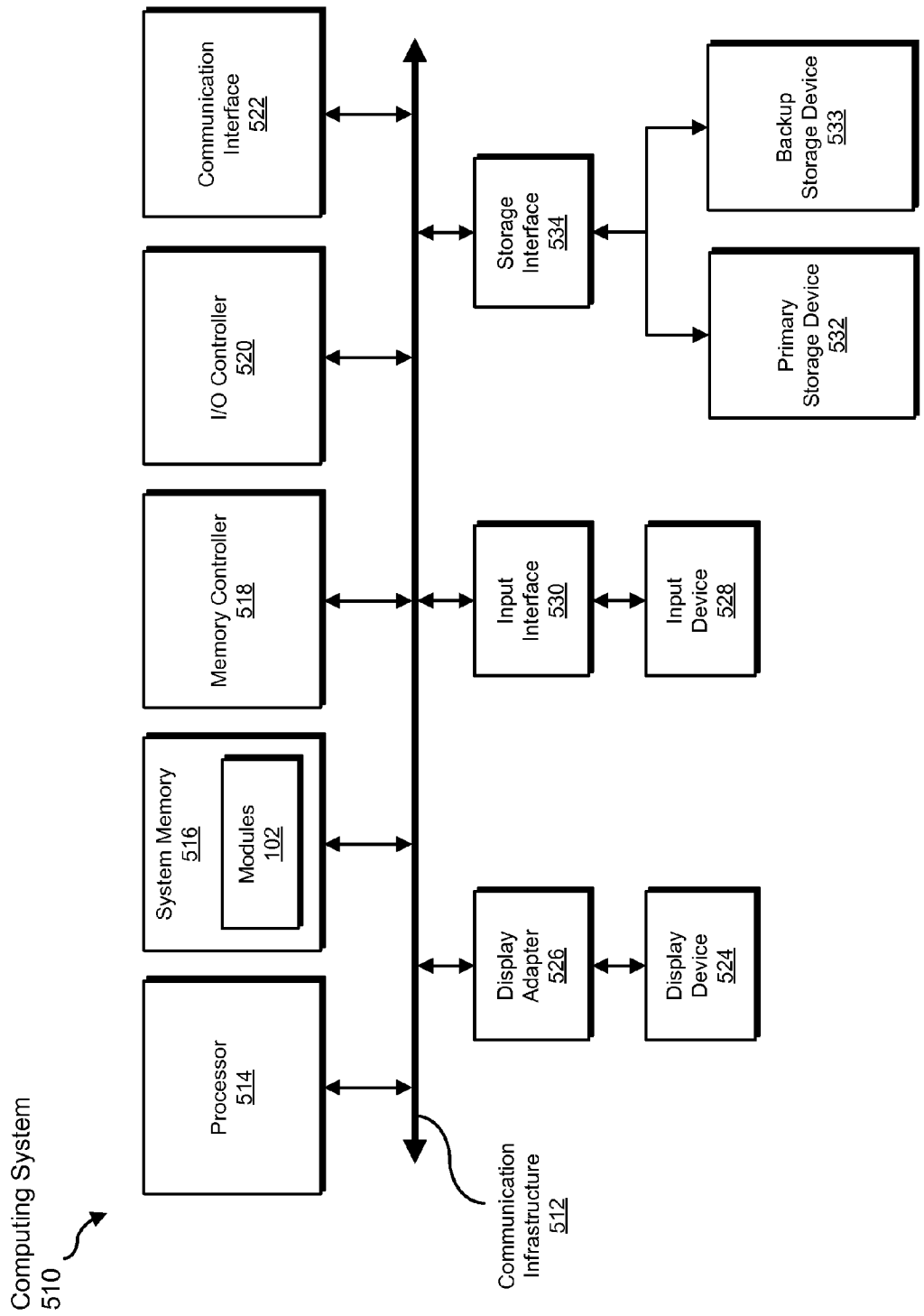
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, encrypting, scanning, determining, implementing, migrating, and performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
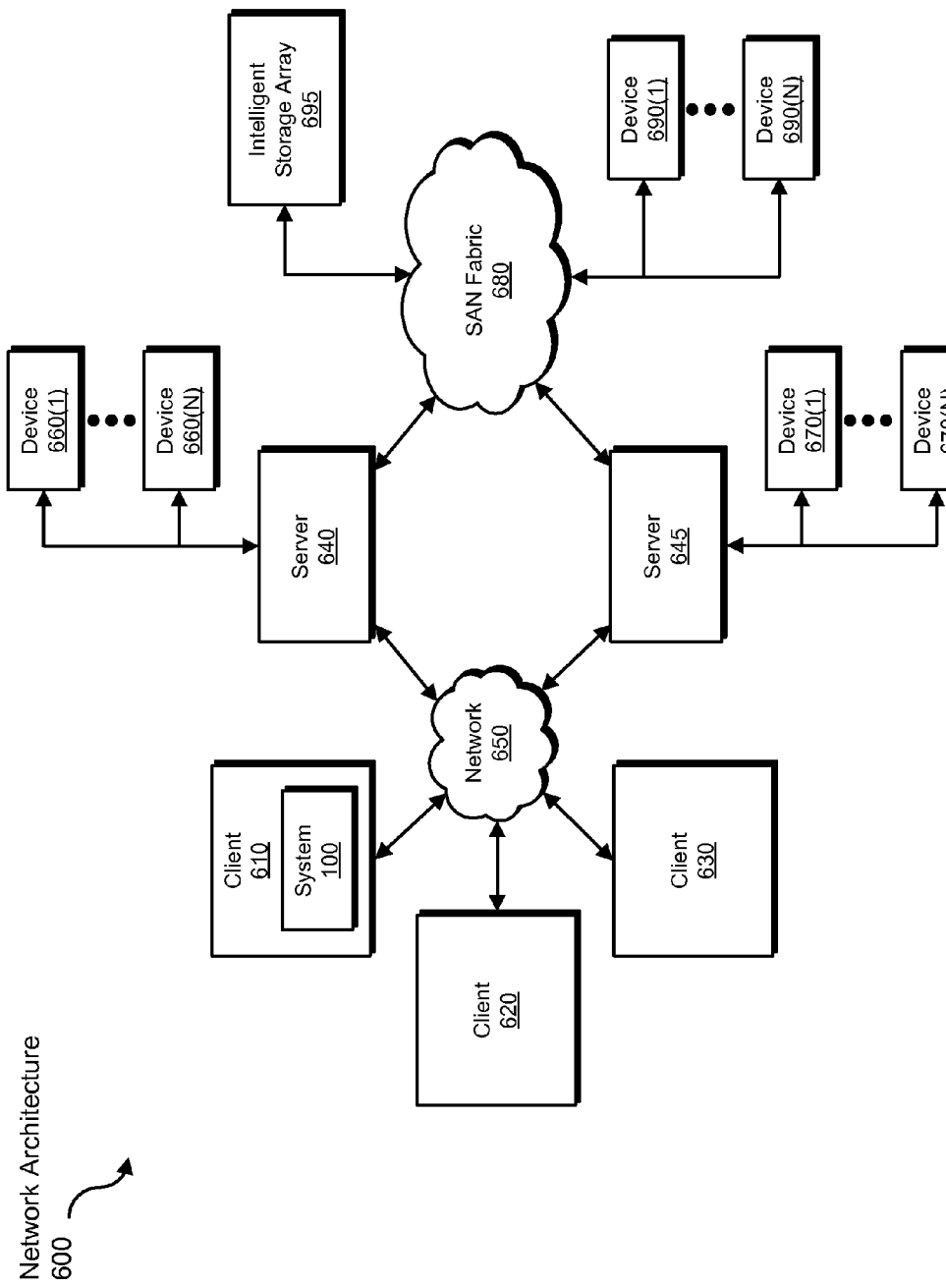
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, encrypting, scanning, determining, implementing, migrating, and performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for optimizing security controls for virtual data centers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for optimizing security controls for virtual data centers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for optimizing security controls for virtual data centers, at least a portion of the method being performed by a computing device comprising at least one processor, the method comprising:
    identifying a security policy that applies to at least one workload, operating within a virtual data center, that is configured to store data on a first storage appliance and to execute on a host system;
    determining that the first storage appliance does not natively implement a data security requirement specified by the security policy on data stored on the first storage appliance;
    identifying a second storage appliance that natively implements the data security requirement specified by the security policy on data stored on the second storage appliance;
    migrating the data from the first storage appliance to the second storage appliance for access by the workload from the host system in response to determining that the first storage appliance does not natively implement the data security requirement specified by the security policy and further in response to determining that the second storage appliance natively implements the data security requirement specified by the security policy.

2. The computer-implemented method of claim 1, wherein:
    implementing the security policy comprises encrypting sensitive data stored by the workload;
    determining that the second storage appliance natively implements the data security requirement specified by the security policy comprises determining that the data security requirement specifies an encryption requirement for data stored by the workload and that the second storage appliance natively implements the encryption requirement.

3. The computer-implemented method of claim 1, wherein:
    implementing the security policy comprises scanning the data stored by the workload;
    determining that the second storage appliance natively implements the data security requirement specified by the security policy comprises determining that the data security requirement specifies a scanning requirement for data stored by the workload and that the second storage appliance natively implements the scanning requirement.

4. The computer-implemented method of claim 1, wherein identifying the security policy that applies to the workload comprises:
    identifying sensitive data that is stored by the workload;
    identifying, in response to identifying the sensitive data, a security policy to encrypt sensitive data stored by the workload.

5. The computer-implemented method of claim 1, wherein identifying the security policy that applies to the workload comprises:
    identifying potentially malicious data stored by the workload;

identifying, in response to identifying the potentially malicious data, a security policy to scan data stored by the workload for malware.

6. The computer-implemented method of claim 1, wherein migrating the data from the first storage appliance to the second storage appliance comprises performing a live migration of the data from the first storage appliance to the second storage appliance without taking the workload offline.

7. The computer-implemented method of claim 1, wherein identifying the second storage appliance further comprises:
identifying an additional security policy that prohibits a predetermined storage location of the data;
determining that the predetermined storage location does not comprise a location of the second storage appliance.

8. A system for optimizing security controls for virtual data centers, the system comprising:
an identification module programmed to identify a security policy that applies to at least one workload, operating within a virtual data center, that is configured to store data on a first storage appliance and to execute on a host system;
a matching module programmed to:
determine that the first storage appliance does not natively implement a data security requirement specified by the security policy on data stored on the first storage appliance;
identify a second storage appliance that natively implements the data security requirement specified by the security policy on data stored on the second storage appliance;
a migration module programmed to migrate the data from the first storage appliance to the second storage appliance for access by the workload from the host system in response to determining that the first storage appliance does not natively implement the data security requirement specified by the security policy and further in response to determining that the second storage appliance natively implements the data security requirement specified by the security policy;
at least one hardware processor device configured to execute the identification module, the matching module, and the migration module.

9. The system of claim 8, wherein:
implementing the security policy comprises encrypting sensitive data stored by the workload;
determining that the second storage appliance natively implements the data security requirement specified by the security policy comprises determining that the data security requirement specifies an encryption requirement for data stored by the workload and that the second storage appliance natively implements the encryption requirement.

10. The system of claim 8, wherein:
implementing the security policy comprises scanning the data stored by the workload;
determining that the second storage appliance natively implements the data security requirement specified by the security policy comprises determining that the data security requirement specifies a scanning requirement for data stored by the workload and that the second storage appliance natively implements the scanning requirement.

11. The system of claim 8, wherein identifying the security policy that applies to the workload comprises:
identifying sensitive data that is stored by the workload;

identifying, in response to identifying the sensitive data, a security policy to encrypt sensitive data stored by the workload.

12. The system of claim 8, wherein identifying the security policy that applies to the workload comprises:
identifying potentially malicious data stored by the workload;
identifying, in response to identifying the potentially malicious data, a security policy to scan data stored by the workload for malware.

13. The system of claim 8, wherein migrating the data from the first storage appliance to the second storage appliance comprises performing a live migration of the data from the first storage appliance to the second storage appliance without taking the workload offline.

14. The system of claim 8, wherein identifying the second storage appliance further comprises:
identifying an additional security policy that prohibits a predetermined storage location of the data;
determining that the predetermined storage location does not comprise a location of the second storage appliance.

15. A computer-readable-storage medium comprising one or more computer-executable instructions that, when executed by at least one processor of a computing device, cause the computing device to:
identify a security policy that applies to at least one workload, operating within a virtual data center, that is configured to store data on a first storage appliance and to execute on a host system;
determine that the first storage appliance does not natively implement a data security requirement specified by the security policy on data stored on the first storage appliance;
identify a second storage appliance that natively implements the data security requirement specified by the security policy on data stored on the second storage appliance;
migrate the data from the first storage appliance to the second storage appliance for access by the workload from the host system in response to determining that the first storage appliance does not natively implement the data security requirement specified by the security policy and further in response to determining that the second storage appliance natively implements the data security requirement specified by the security policy.

16. The computer-readable-storage medium of claim 15, wherein:
the one or more computer-executable instructions cause the computing device to implement the security policy by causing the computing device to encrypt sensitive data stored by the workload;
the one or more computer-executable instructions cause the computing device to determine that the second storage appliance natively implements the data security requirement specified by the security policy by causing the computing device to determine that the data security requirement specifies an encryption requirement for data stored by the workload and that the second storage appliance natively implements the encryption requirement.

17. The computer-readable-storage medium of claim 15, wherein:
the one or more computer-executable instructions cause the computing device to implement the security policy by causing the computing device to scan the data stored by the workload;

the one or more computer-executable instructions cause the computing device to determine that the second storage appliance natively implements the data security requirement specified by the security policy by causing the computing device to determine that the data security requirement specifies a scanning requirement for data stored by the workload and that the second storage appliance natively implements the scanning requirement.

18. The computer-readable-storage medium of claim 15, wherein the one or more computer-executable instructions cause the computing device to identify the security policy that applies to the workload by causing the computing device to:
   identify sensitive data that is stored by the workload;
   identify, in response to identifying the sensitive data, a security policy to encrypt sensitive data stored by the workload.

19. The computer-readable-storage medium of claim 15, wherein the one or more computer-executable instructions cause the computing device to identify the security policy that applies to the workload by causing the computing device to:
   identify potentially malicious data stored by the workload;
   identify, in response to identifying the potentially malicious data, a security policy to scan data stored by the workload for malware.

20. The computer-readable-storage medium of claim 15, wherein the one or more computer-executable instructions cause the computing device to migrate the data from the first storage appliance to the second storage appliance by causing the computing device to perform a live migration of the data from the first storage appliance to the second storage appliance without taking the workload offline.

\* \* \* \* \*